(No Model.)
A. KINGSBURY.
PLOTTER.
No. 438,350. Patented Oct. 14, 1890.
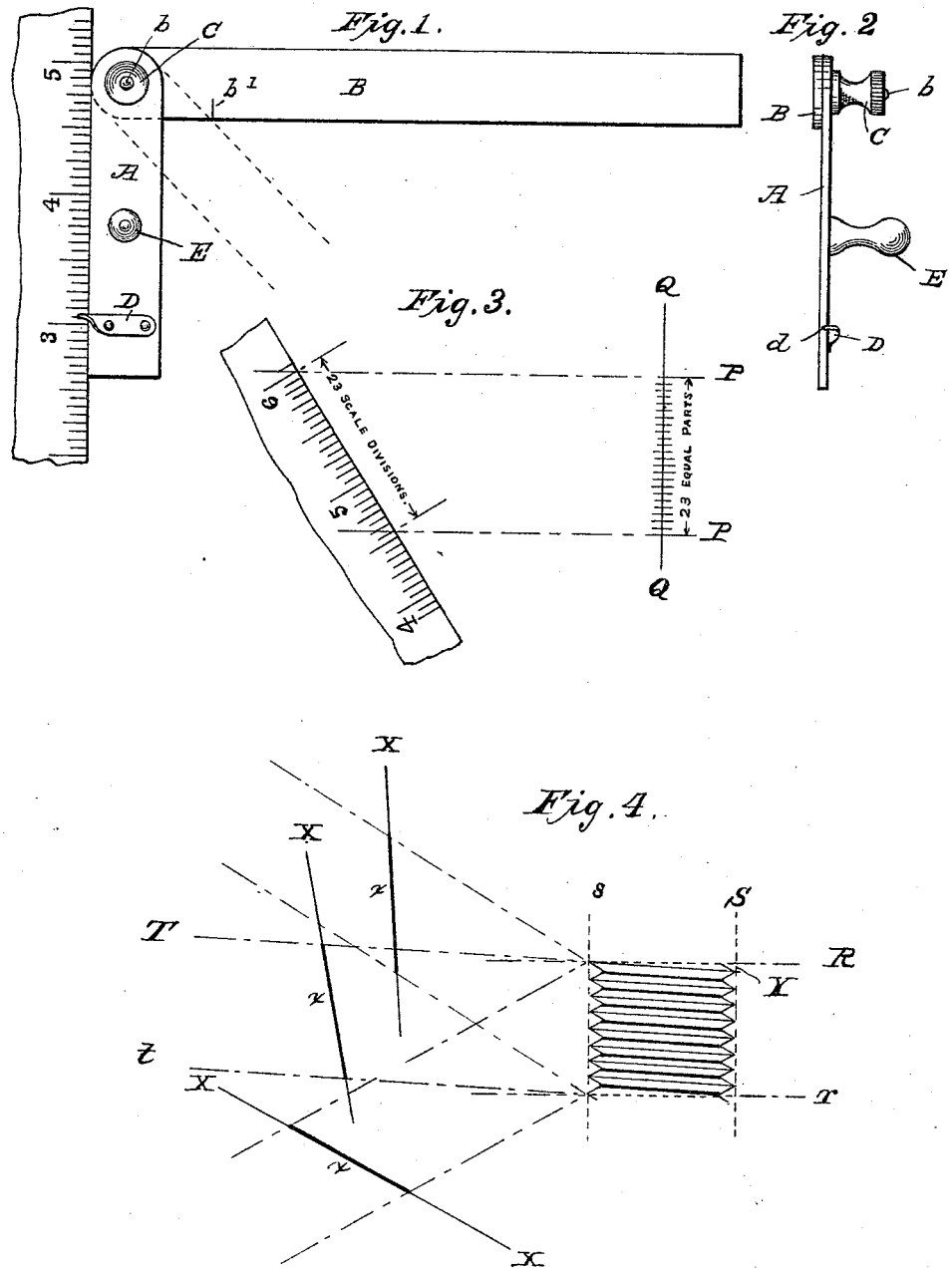
Witnesses
F. A. Mercie
W. B. Howe
Inventor
Albert Kingsbury
By his Attorney J. B. Thurston

UNITED STATES PATENT OFFICE.

ALBERT KINGSBURY, OF HANOVER, NEW HAMPSHIRE.

PLOTTER.

SPECIFICATION forming part of Letters Patent No. 438,350, dated October 14, 1890.

Application filed April 14, 1890. Serial No. 347,787. (No model.)

*To all whom it may concern:*

Be it known that I, ALBERT KINGSBURY, a citizen of the United States, residing at Hanover, in the county of Grafton and State of New Hampshire, have invented certain new and useful Improvements in Section-Liners, of which the following is a specification.

This invention relates to implements for draftsmen's use, its object being to enable a draftsman to draw parallel lines, either horizontally, vertically, or at any desired angle, which shall be equidistant one from the other, thereby making his work neater and more artistic.

The invention involves the use of a scale, the graduations of which are utilized for equalizing the section or other lines to be drawn.

The invention is fully set forth in the following specification and claim, and clearly illustrated in the accompanying drawings, forming an inseparable part thereof, of which—

Figure 1 represents my improved implement in plan view, and a section of a scale in relative position therewith for performing certain work, Fig. 2 being an edge view of the tool. Fig. 3 shows the position in which to place the scale in order to make by my improved implement a given number of parallel lines between two given points, and Fig. 4 shows the position in which to place the scale in order that the instrument may perform another class of work.

Similar reference-letters designate like parts.

The gage-bar A is perforated at one end, and a straight-edge B is provided near one end with a screw-stud *b*, which enters the perforation in said gage-bar and is conveniently adjusted and secured at any desired angle with the latter by a thumb-nut C, which is threaded to said stud *b*. Near the opposite end of said gage-bar is secured thereon a gage D, which projects beyond the edge of said gage-bar on one side, said projection being formed into a tooth *d*, adapted for engaging the graduations of a scale. Said gage-bar may also be provided with a knob or handle E for the purpose of more readily and accurately moving the same along the scale-graduations.

With this instrument, taken in connection with a scale, any required number of divisions equidistant apart may be set off between two given points. For instance, as in Fig. 3, it is required to divide the space between the lines P P into twenty-three equal parts. Count off twenty-three graduations on the scale and place the scale at the proper angle with the lines P P to measure the correct number of divisions. Then place the gage A against said scale, moving the straight-edge B to a position parallel with the lines P P, and the divisions shown on the line Q may be easily and accurately drawn off successively by moving the improved instrument along the scale; or suppose a screw is to be drawn, this instrument is admirably adapted for laying it out. Suppose eight threads are required to the inch. In Fig. 4 the broken horizontal lines R *r* represent the space in which the eight threads must be placed. Draw the lines S *s*, representing the full diameter of the screw, and point off at Y one-sixteenth of an inch. Draw the line T thence through the point where the lines R and *s* intersect. Draw the line *t* parallel with the line T to cut the point at which the lines *r* and *s* intersect, and place the scale in a position indicated by the line X, the heavy portion *x* of which represents sixteen scale-divisions, and by aid of the improved section-liner the threads of a screw may be accurately projected, as shown. By placing the scale so that eight graduations fill the space indicated by the heavy portions *x* of the line X my improved section-liner will accurately lay off the angles of the threads.

If desired, the straight-edge B may be marked, as at *b'*, at one or more points to indicate angles—*i. e.*, in Fig. 1 a mark *b'* is shown, and when the part B is moved down so that said mark is in contact with the edge of the gage A an angle of forty-five degrees is the result, as shown by dotted lines.

Having described my improved instrument, what I claim is—

In a drawing implement, the combination, with a straight-edge and a gage-bar adjustably connected one to the other by means of a stud passing from one through the other, and a thumb-nut threaded to the stud, of a gage D, attached to said gage-bar and provided with a projecting tooth d, and a suitable knob or finger-piece E, also attached to said gage-bar, all substantially for the purpose set forth.

In testimony whereof I affix my signature in presence of two witnesses.

ALBERT KINGSBURY.

Witnesses:
J. B. THURSTON,
NATHANIEL E. MARTIN.